(12) United States Patent
Thomas

(10) Patent No.: US 6,422,623 B1
(45) Date of Patent: Jul. 23, 2002

(54) SKIMMER LID AND BASKET LIFTING TOOL

(76) Inventor: Rick Thomas, 400 N. Oak La., Russellville, AR (US) 72802

( * ) Notice: Subject to any disclaimer, the term of this patent is extended or adjusted under 35 U.S.C. 154(b) by 0 days.

(21) Appl. No.: 09/695,456

(22) Filed: Oct. 24, 2000

(51) Int. Cl.[7] .............................. B65G 7/12; B66F 11/00
(52) U.S. Cl. ............................................ 294/24; 294/26
(58) Field of Search ............................ 294/10, 12, 15, 294/17, 18, 19.1, 22–24, 26, 58

(56) References Cited

U.S. PATENT DOCUMENTS

| | | | | |
|---|---|---|---|---|
| 572,815 A | * | 12/1896 | Nicholes | 294/12 |
| 579,675 A | * | 3/1897 | Glover | 294/24 |
| 1,083,054 A | * | 12/1913 | Brown | 294/58 |
| 1,083,808 A | * | 1/1914 | Dunson | 294/27.1 |
| 1,562,034 A | * | 11/1925 | Mieher | 294/26 |
| 2,086,318 A | * | 7/1937 | Jackson | 294/17 |
| 2,271,901 A | * | 2/1942 | Smith et al. | 294/26 |
| 4,354,702 A | * | 10/1982 | Clements et al. | 294/15 |
| 5,137,314 A | * | 8/1992 | Gunter | 294/26 |
| 5,314,220 A | * | 5/1994 | Clement | 294/24 |

* cited by examiner

*Primary Examiner*—Dean J. Kramer
(74) *Attorney, Agent, or Firm*—Dale J. Ream

(57) ABSTRACT

A skimmer lid and basket lifting tool comprises an elongate handle member having proximal and distal ends relative to a user. A generally L-shaped hook member is integrally attached to the distal end of the handle member and is adapted to be extended into an aperture of a skimmer lid. Once inserted, a user may lift the lid from the skimmer well by lifting the handle member. The lifting tool further includes a pair of U-shaped hook members attached to the handle member at a point spaced from the distal end. Once the skimmer well lid has been removed using the L-shaped hook member, the U-shaped hook members may be extended through an open top of a skimmer basket and positioned so as to engage a transverse handle therein, whereby to lift the basket from the well.

15 Claims, 4 Drawing Sheets

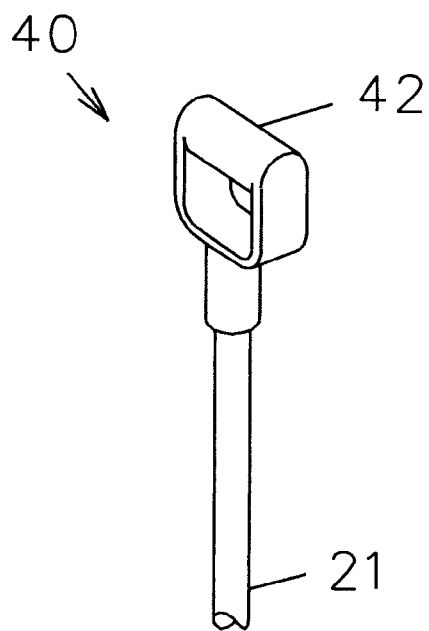
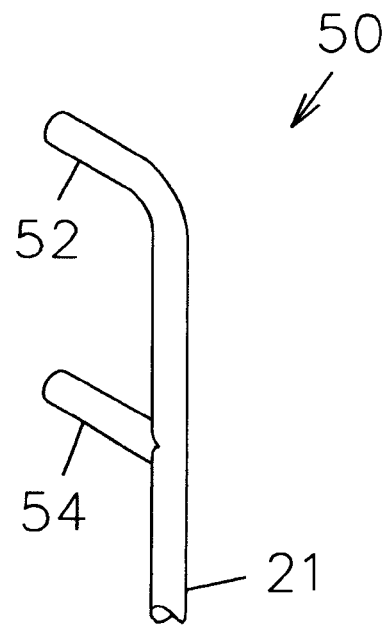
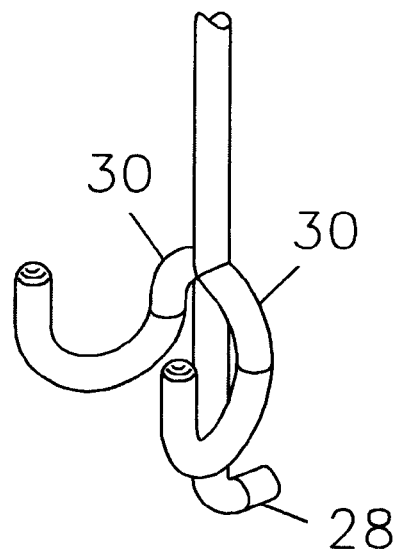
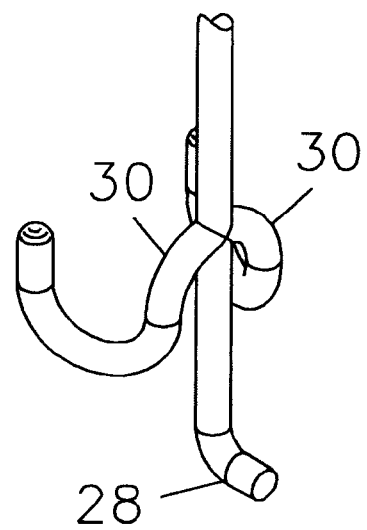
FIG. 5  FIG. 6

SKIMMER LID AND BASKET LIFTING TOOL

BACKGROUND OF THE INVENTION

This invention relates generally to swimming pool skimmer system accessories and, more particularly, to a tool for removing or replacing a skimmer lid and basket without a user bending over or directly touching the lid or basket.

Removing debris from a swimming pool is a continuous maintenance task. One method for cleaning the pool is using a skimmer net on a long pole. In addition, many pools utilize perforated skimmer baskets that continuously filter the water by trapping debris within the baskets and then recirculating the water into the pool. Over time, the baskets may become clogged with debris and need to be emptied and cleaned. However, removing a skimmer basket from a skimmer well within a pool deck is an inconvenient and undesirable task. First, skimmer well lids are mounted flush with the pool deck so as not to be a tripping hazard and, therefore, are not conveniently removed. Second, it is undesirable to manually remove a skimmer basket as the basket may be filled with leaves, debris, insects, or even snakes.

Various devices have been proposed in the art for skimming swimming pools or cleaning pool areas. Although assumably effective for their intended purposes, these devices do not provide means for removing both the lid and basket from a skimmer well without requiring a user to bend over or to touch the lid or basket.

Therefore, it is desirable to have a lifting tool for separately lifting a skimmer lid and basket from a skimmer well without a user having to bend over or touch the skimmer well.

SUMMARY OF THE INVENTION

A skimmer lid and basket lifting tool according to the present invention includes an elongate handle member having proximal and distal ends relative to a user. A generally L-shaped hook member is formed at the distal end of the handle member and is configured for insertion through an aperture defined by a conventional lid covering a skimmer well. Once inserted, the lid may be lifted from the well when a user lifts the handle member. A pair of generally U-shaped hook members are fixedly attached to the handle member at a point intermediate proximal and distal ends. Free ends of the U-shaped hook members are upstanding along an imaginary axis parallel to the handle member. The skimmer lid and basket lifter may be manipulated by a user such that the U-shaped hook members may be positioned beneath a handle bar in the basket. In this configuration, the basket may be lifted from the skimmer well upon a lifting of the handle member.

Therefore, a general object of this invention is to provide a lifting tool for lifting a skimmer lid and basket from a skimmer well without requiring a user to bend over, kneel down, or touch the lid or basket.

Another object of this invention is to provide a lifting tool, as aforesaid, having a handle that is easy to grasp and lift.

Still another object of this invention is to provide a lifting tool, as aforesaid, which is universal for use with conventional skimmer lids and baskets.

Yet another object of this invention is to provide a lifting tool, as aforesaid, which is easy to use and economical to manufacture.

A further object of this invention is to provide a lifting tool, as aforesaid, having a handle of sufficient length so as to eliminate the need of a user to bend over during use thereof.

A still further object of this invention is to provide a lifting tool, as aforesaid, having hook members configured for separately engaging the lid and basket of a skimmer well.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 5 is a perspective view of the lifting tool as in FIG. 3 having a D-handle; and FIG. 6 is a perspective view of the lifting tool as in FIG. 4 having a double-bar handle.

DESCRIPTION OF THE PREFERRED EMBODIMENT

Figure 1:
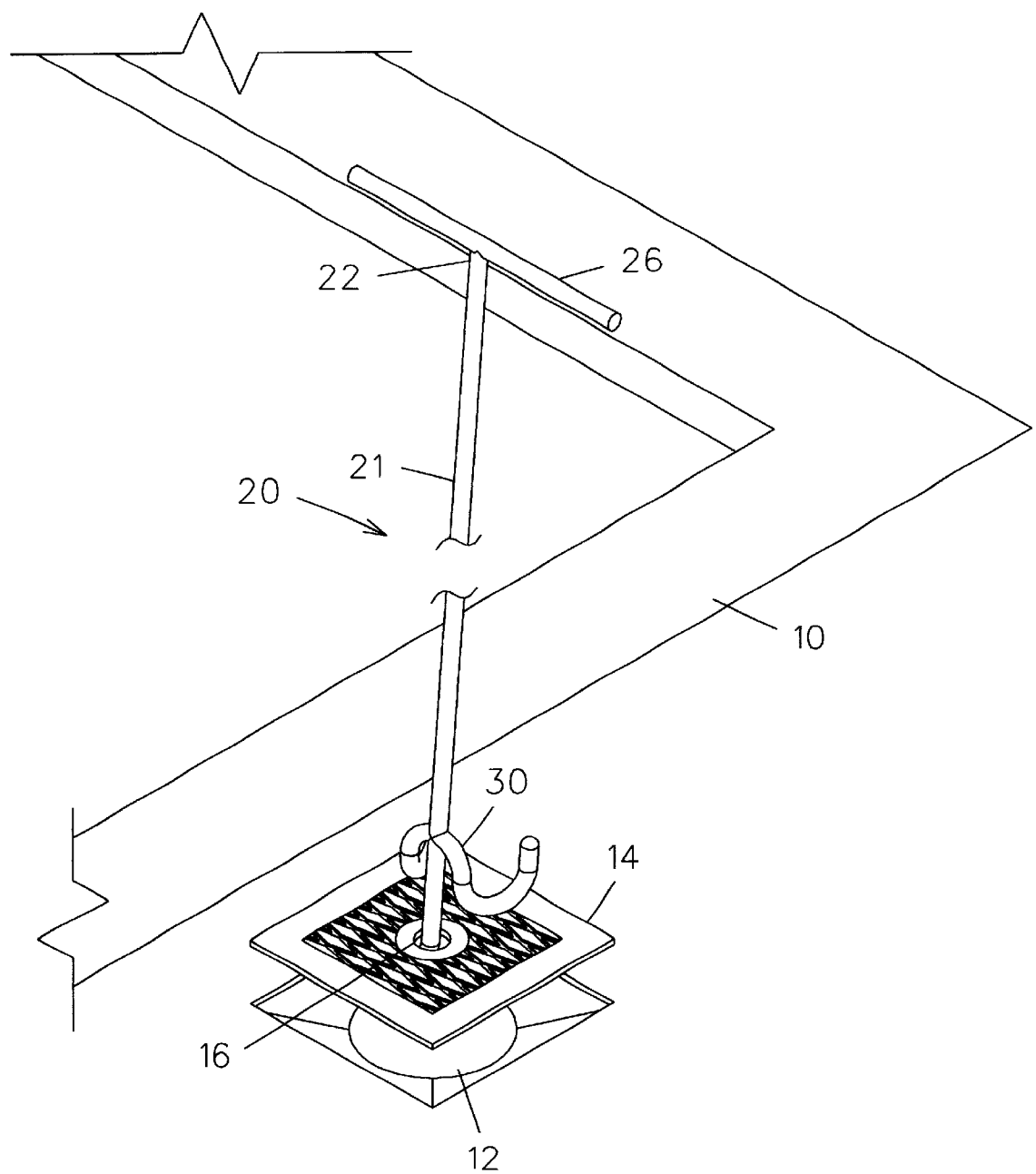
FIG. 1 is a perspective view of a skimmer lid and basket lifter according to the present invention in a skimmer lid lifting configuration.
Figure 2:
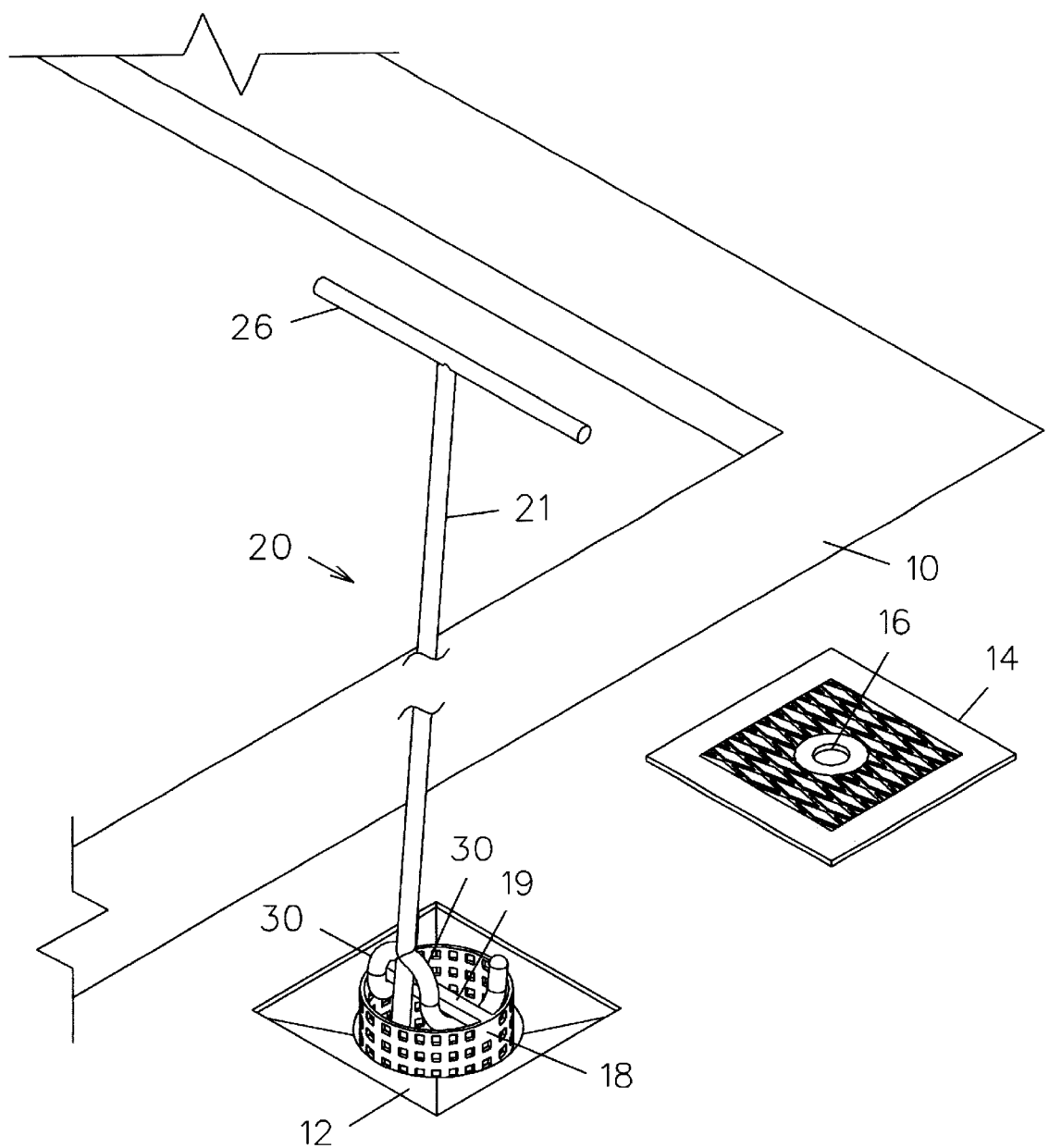
FIG. 2 is a perspective view of the lifting tool as in FIG. 1 in a skimmer basket lifting configuration.

A skimmer lid and basket lifting tool according to the present invention will now be described with reference to FIGS. 1–6 of the accompanying drawings. The lifting tool 20 is especially useful for lifting a conventional skimmer lid 14 and basket 18 from a skimmer well 12 (FIGS. 1 and 2). A typical skimmer lid 14 includes a flat grated plate that defines a central aperture 16. The lid 14 is configured to cover the opening of a skimmer well 12 and lies flush with the pool deck 10 in which the skimmer well 12 is mounted. The skimmer well 12 is generally cylindrical and is adapted to receive a cylindrical skimmer basket 18 therein. The basket includes a plurality of apertures in its side and bottom walls and has an open top. A handle bar 19 extends diametrically across the basket 18 adjacent the open top thereof whereby a user may remove the basket from the well.

Figures 3, 4:
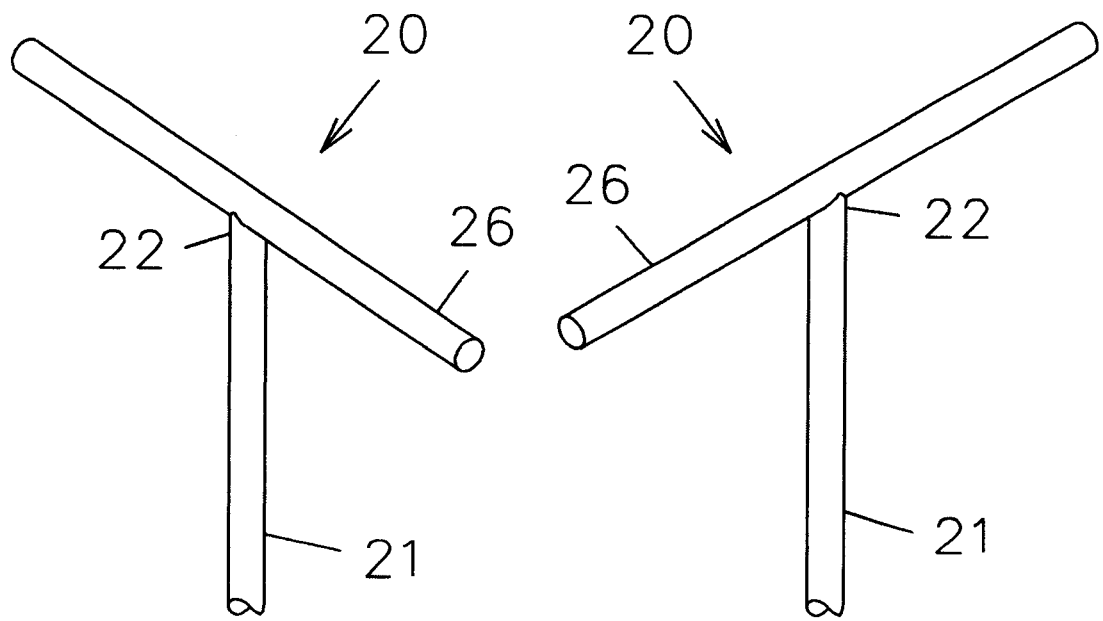
FIG. 3 is a front perspective view of the lifting tool as in FIG. 1.
FIG. 4 is a rear perspective view of the lifting tool as in FIG. 2.

The lifting tool 20 includes an elongate handle member 21 having proximal 22 and distal 24 ends relative to a user. As shown in FIGS. 1–4, the handle member 21 forms a T-handle that includes a linear bar 26 fixedly attached to the proximal end 22 and normal to the elongate portion of the handle member 21. The handle member 21 is constructed of a rigid plastic material although a metal construction would also be suitable. A hook member 28 that is rounded into a generally L-shaped 25 configuration depends from the distal end 24 of the handle member 21 (FIG. 4). The L-shaped hook member 28 includes a free end having a flat or blunt construction. The L-shaped hook member 28 defines a diameter slightly smaller than a diameter of the skimmer lid aperture 16. A pair of U-shaped hook members 30 are fixedly attached to the handle member 21 at a point spaced apart from the distal end 24 but closer thereto than to the proximal end 22 (FIG. 5). Each U-shaped hook member 30 includes a free end having a flat or blunt construction. The free end portion of each U-shaped hook member 30 further defines an imaginary longitudinal axis that is parallel to the elongate handle member 21. Preferably, the L-shaped hook member 28 and U-shaped hook members 30 extend from the handle member 21 in opposed directions (FIGS. 4 and 5).

In use, the handle member 21 may be oriented by a user so that the free end of the L-shaped hook member 28 is selectively inserted through the skimmer lid aperture 16. When the handle member 21 is moved to an upright position, the free end portion of the L-shaped hook member engages the underside of the skimmer lid 14 and the lid may be lifted from the skimmer well 12. Manipulation of the handle member 21 allows the lid 14 to be deposited on the pool deck 10. The distal end 24 of the handle member 21 may then be lowered into the skimmer basket 18 and positioned such that the U-shaped hook members 30 are immediately beneath the basket handle bar 19. The handle bar 19 is engaged by the U-shaped hook members 30 and the basket 18 may be lifted upon a user lifting the handle member 21.

Another embodiment of the lifting tool 40 is shown in FIG. 5 and is substantially similar in construction to that described above except as particularly noted below. This embodiment includes a D-handle 42 fixedly attached to the proximal end of the handle member 21 rather than a T-handle. This type of handle is very familiar to users and allows the use of two hands—one on the D-handle and one on the elongate portion of the handle member 21—if desired.

Still another embodiment of the lifting tool 50 is shown in FIG. 6 and is substantially similar in construction to that described above except as particularly noted below. In this embodiment, a portion of the elongate handle member adjacent the proximal end 22 thereof is formed at an upwardly extending angle of about 45. This is a first handle bar 52. Spaced from the first handle bar 52 is a second handle bar 54 fixedly attached to the elongate handle member 21 and extending upwardly at about a 45° angle. The first 52 and second 54 handle bars are parallel to one another. This configuration allows a user to grasp the two handle bars with separate hands for increased leverage.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A lifting tool for use with a skimmer lid defining an aperture and a skimmer basket having a handle therein and adapted to be positioned in a skimmer well, said lifting tool comprising:

an elongate shaft having proximal and distal ends relative to a user;

a generally L-shaped hook member attached to said distal end of said shaft and adapted to be selectively inserted through said aperture of said skimmer lid for lifting said skimmer lid; and a pair of spaced apart U-shaped hook members attached to said shaft at a point longitudinally spaced from said distal end and longitudinally spaced from said L-shaped hook member, said pair of U-shaped hook members being adapted to selectively engage said handle of said skimmer basket for lifting said skimmer basket from said skimmer well.

2. A lifting tool as in claim 1 wherein said shaft includes a T-handle configuration at said proximal end thereof.

3. A lifting tool as in claim 1 further comprising a D-handle coupled to said proximal end of said shaft.

4. A lifting tool as in claim 1 further comprising:

a first handle bar integrally attached to said proximal end of said shaft and extending upwardly therefrom at about a 45° angle; and a second handle bar fixedly attached to said shaft and extending therefrom parallel to said first handle bar, whereby to enhance the leverage of a user operating said tool.

5. A lifting tool as in claim 1 wherein said L-shaped hook member includes a free end having a blunt configuration.

6. A lifting tool as in claim 1 wherein each U-shaped hook member includes a free end having a blunt configuration.

7. A lifting tool as in claim 6 wherein said free end of said each U-shaped hook member defines a longitudinal axis parallel to said shaft.

8. A lifting tool as in claim 1 wherein said generally L-shaped hook member and said pair of U-shaped hook members extend in opposed directions relative to said shaft.

9. A lifting tool for use with a skimmer lid defining an aperture and a skimmer basket having a handle therein, said lifting tool, comprising:

a handle member having proximal and distal ends relative to a user;

a generally L-shaped hook member fixedly attached to said distal end of said handle member, said L-shaped hook member having a short length dimension, said L-shaped hook member being adapted to selectively engage a skimmer lid, whereby to lift said skimmer lid from said skimmer well;

a pair of U-shaped hook members fixedly attached to said handle member, said pair of U-shaped hook members being longitudinally spaced from said generally L-shaped hook member and adapted to selectively engage a skimmer basket in said skimmer well, whereby to lift said skimmer basket from said skimmer well; and wherein said generally L-shaped hook member and said pair of U-shaped hook members extend in opposed directions relative to said handle member.

10. A skimmer lid and basket lifter as in claim 9 wherein said pair of U-shaped hook member is adapted to engage a handle that extends transversely in said skimmer basket.

11. A skimmer lid and basket lifter as in claim 9 wherein said handle member includes a T-handle configuration at said proximal end.

12. A skimmer lid and basket lifter as in claim 9 wherein said handle member includes a D-handle at said proximal end.

13. A skimmer lid and basket lifter as in claim 9 further comprising:

a first handle bar integrally attached to said proximal end of said handle member and extending upwardly therefrom at about a 45° angle; and a second handle bar fixedly attached to said handle member and extending therefrom parallel to said first handle bar, whereby to enhance the leverage of a user operating said tool.

14. A skimmer lid and basket lifter as in claim 9 wherein said L-shaped hook member includes a free end having a blunt tip.

15. A skimmer lid and basket lifter as in claim 9 wherein each U-shaped hook member includes a free end having a blunt tip.

* * * * *